United States Patent

[11] 3,601,688

[72] Inventors Peter Dogadko;
 Forbes D. Gilchrist, both of Chicago, Ill.
[21] Appl. No. 6,367
[22] Filed Jan. 28, 1970
[45] Patented Aug. 24, 1971
[73] Assignee Motorola, Inc.
 Franklin Park, Ill.

[54] VOLTAGE REGULATOR FOR PERMANENT MAGNET GENERATORS
 8 Claims, 3 Drawing Figs.

[52] U.S. Cl. ............................................. 323/20,
 321/46, 307/252 N, 322/29, 322/72, 323/22 SC,
 323/35, 323/38
[51] Int. Cl. .................................................... G05f 1/44,
 G05f 5/00
[50] Field of Search ........................................ 323/34, 35,
 41, 38, 4, 9, 16–22; 307/252, 301; 322/22, 29, 72;
 321/45, 46

[56] References Cited
 UNITED STATES PATENTS
3,195,029  7/1965  Gilbreath .................... 323/22 SC X

| | | | |
|---|---|---|---|
| 3,316,477 | 4/1967 | Shrider et al. ................ | 321/46 |
| 3,320,435 | 5/1967 | Watters ....................... | 307/252.70 |
| 3,382,425 | 5/1968 | Legatti ........................ | 323/22 X (SC) |
| 3,414,774 | 12/1968 | Motta .......................... | 322/22 X (SC) |

*Primary Examiner* — Gerald Goldberg
*Attorney* — Mueller and Aichele

ABSTRACT: A voltage regulator circuit having an input terminal for connection to the output of a permanent magnet generator which develops a voltage at its output variable in frequency and amplitude in response to the speed of rotation of the generator. A current control device is arranged to switchably connect the output of the generator to a desired load in response to trigger pulses which are generated at desired phase angles during each half cycle of a given polarity of the applied voltage. The output of the voltage regulator may be free of an external power source, and in such case, means are provided to always establish at least a minimum current flow at the output of the regulator during no load conditions to effect continuous operation of the regulator for all voltage values at the output of the generator.

INVENTORS.
PETER DOGADKO
FORBES D. GILCHRIST

BY Mueller, Aichele & Rauner

ATTORNEYS.

INVENTORS.
PETER DOGADKO
FORBES D. GILCHRIST

BY Mueller, Aichele & Rauner

ATTORNEYS.

VOLTAGE REGULATOR FOR PERMANENT MAGNET GENERATORS

Background of the Invention

Voltage regulator circuits generally are well-known in the art to control the voltage value at the output of such regulators so as to be at a given fixed voltage value, or at least within a given minimum range of voltage values, regardless of voltage variations at the input of the voltage regulator. Voltage regulators which generally operate from a source of alternating current voltage and rectify the voltage to produce a direct current voltage at the output thereof, generally operate in conjunction with fixed frequency alternating current supplies. Also, many of the voltage regulators of the prior art require a reference potential from an external power source, such as a battery, to be used as an initiating means to initiate operation of the voltage regulator when an overvoltage condition exists at the input thereof, which overvoltage condition may tend to disable the regulator and prevent current flow from the input to the output of the regulator. Also, external power sources are used many times to establish a reference voltage value to limit the output of the voltage regulator.

Voltage regulator circuits, wherein the output of the voltage regulator is used to supply charging current to a battery of an automobile, or the like and to supply current to a load, will not operate properly when the battery connection is removed. In this type of power system a permanent magnet dynamoelectric machine, such as a generator or alternator, is used to apply alternating current voltage to the input of the voltage regulator whereupon this alternating current voltage is rectified and regulated to supply the charging current to the battery and to apply additional current to one or more current load devices which are connected in circuit with the output of the regulator. Such voltage regulator circuits have voltage limiting circuit means to prevent overcharging of the battery and the battery potential is used at a reference voltage for the voltage limiting circuit. Since the frequency and amplitude of the output of a permanent magnet alternator depend on, among other things, the speed of rotation of the armature of the alternator, such voltage regulators must operate independent of frequency but dependent on voltage value. Although voltage regulators of the prior art find great acceptance as providing means to regulate charging current applied to the storage battery of an automobile, it has been found that if no battery connection is supplied at the output of the voltage regulator the circuit operates in an unusual and undesirable manner. For example, upon application of an overvoltage to the input of the regulator circuit the regulator may progressively decrease the amount of power applied to the output until a point is reached where the voltage regulator completely cuts off power to the output thereof for as long as the overvoltage condition exists. Therefore, during this overvoltage condition should a load be applied to the output of the alternator the absolute cutoff of the alternator by the regulator will be such that no current will be supplied to the load and, as such, a load condition cannot be sensed until the voltage value at the output of the alternator is decreased to be within the voltage regulating range of the voltage regulator.

Because of the increasing number of small engine driven vehicles, such as snowmobiles or the like, as well as the vast number of utility engines used in the various fields of construction and labor, it is desired to provide a voltage regulator system which will function properly without the use of a storage battery connected at the output terminals thereof. This is particularly desirable in situations where the small engines are hand-started, by a pull rope or the like, and have no battery supply associated with them.

SUMMARY OF THE INVENTION

Accordingly, it is an object of this invention to provide a voltage regulator circuit which will operate over the entire range of output voltages of a dynamoelectric machine when no battery supply is connected at the output terminals of the regulator.

Another object of this invention is to provide a voltage regulator circuit which is inexpensive to manufacture, efficient and reliable in operation, and simple and small in size to be readily adaptable for use in the electrical systems of small engines.

Briefly, the voltage regulator circuit of this invention uses a current control device having its load electrodes connected between input and output terminals of the regulator circuit and a control electrode which is coupled to the output of a triggering circuit. Trigger pulses are applied to the control electrode at phase angles, with respect to the phase angle of the applied alternating current voltage, which vary between zero and 180°, and automatically vary in accordance with the current requirements at the load connected at the output of the voltage regulator.

Additionally, circuit means are provided so that increasing voltage at the input of the regulator circuit will cause automatic phase shifting of the triggering pulses to decrease the amount of power applied to the output of the voltage regulator over a range of load conditions. That is, with a large load connected to the output terminals of the voltage regulator a relatively small phase shift between the applied alternating current voltage and the trigger pulse is provided so as to apply substantially the entire pulse of voltage and current to the output of the regulator circuit. On the other hand, when the load decreases so also does the power at the output of the voltage regulator as a result of a corresponding increase in the phase shift of the trigger pulses to decrease the fraction of each pulse of applied voltage to a lesser amount corresponding to the then existing requirements of the load.

For purposes of explanation throughout the specification and claims it is herein defined that a decreasing phase shift of trigger pulses toward zero degrees phase shift causes a corresponding increase in the power applied to the output terminal of the voltage regulator while an increasing phase shift from 0° to 180°, corresponding to one-half cycle of an applied alternating current voltage, causes a corresponding decrease in the power applied to the output terminal of the voltage regulator.

Therefore, with decreasing load at the output of the regulator, or with increasing voltage applied to the input of the voltage regulator, automatic phase shifting of the trigger pulses will occur tending to increase the phase shift thereby decreasing the power applied to the output terminal of the voltage regulator. However, in accordance with one embodiment of this invention, means are provided to limit the maximum amount of phase shift that can be achieved by the trigger circuit so as to always insure at least a fractional portion of each pulse of applied voltage to be delivered at the output of the voltage regulator thereby maintaining a minimum current flow through the voltage regulator circuit at voltage values in excess of a predetermined voltage value as well as under no load conditions. For example, with a constant load connected to the output terminals of the voltage regulator, an increasing voltage at the input terminals thereof will cause automatic phase shift of the trigger pulses which, in turn, decreases the amount of power of each pulse applied to the load thus maintaining the average power to the load substantially constant. The other example is where the applied alternating current voltage at the input terminals of the voltage regulator is maintained substantially constant but where the load is decreased or substantially eliminated. For example, a no load condition at the output terminal of the voltage regulator will usually cause a corresponding voltage increase to be sensed within the voltage regulator automatically and instantaneously to increase the phase shift of the trigger pulses to a maximum phase angle which will cause a minimum current to pass through the voltage regulator. This feature of the invention is particularly useful in decreasing the open circuit potential at the output of voltage regulator systems when no load is connected thereto, and may serve as a personnel safety feature. That is, the open circuit potential at the output of the voltage regulator may be in the order of 10 volts more or less, when no load or a substantially minimum load is connected at the output terminals. On the other hand, as soon as a load is applied to the output terminals, current increases which, in turn, decreases the phase shift of the trigger pulses to render the current control device conductive at a higher potential value of the applied alternating current voltage to increase the voltage at the load as required to apply sufficient power to the load.

DESCRIPTION OF THE PREFERRED EMBODIMENT

Figure 1:
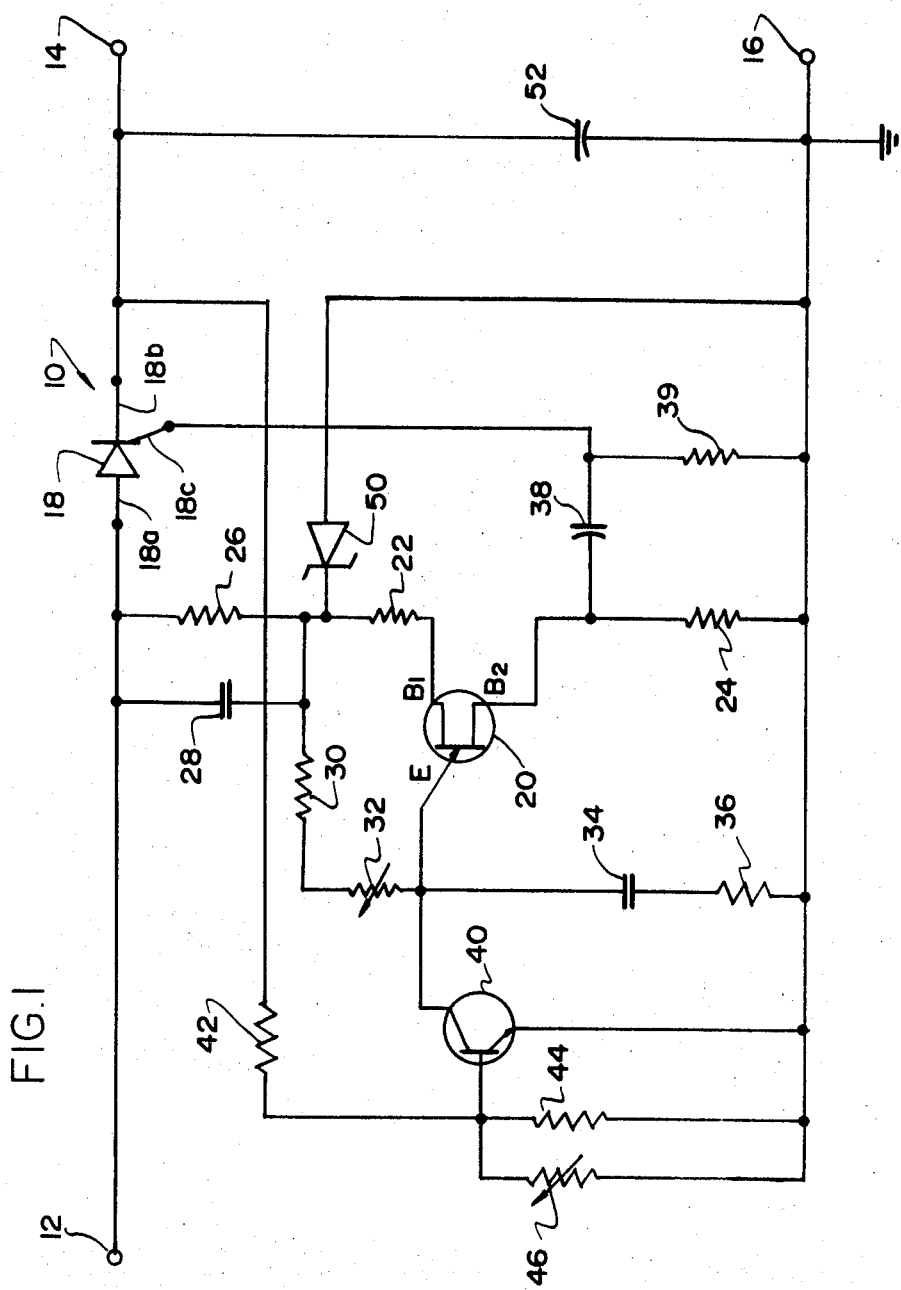
FIG. 1 is a schematic wiring diagram of one embodiment of this invention.

Referring now to FIG. 1 there is seen a voltage regulator circuit constructed in accordance with this invention and designated generally by reference numeral 10. An input terminal 12 is arranged for connection to any suitable source or alternating current voltage which is to be regulated by the voltage regulator 10 and maintained at a substantially constant average voltage value at an output terminal 14. The average voltage value at output terminal 14 is indicative of the load current passing therethrough, i.e. increasing load current causing a decrease in the average voltage value and decreasing load current causing an increase in the average voltage value. Preferably, the voltage at input terminal 12 is a series of half cycle pulses of alternating current which are all of the same polarity as would be obtained either by a half-wave or full-wave rectifier circuit, not shown. Although the voltage regulator 10 can be used with any source of alternating current voltage, it is contemplated by this invention that the voltage regulator 10 is particularly useful for receiving alternating current voltage from a permanent magnet dynamoelectric machine, such as a generator or alternator, or the like, driven by an internal combustion engine. Such permanent magnet alternators develop an output voltage of alternating current configuration which varies in amplitude and frequency in accordance with the speed of rotation of the alternator which, most always, conforms to the speed of rotation of the internal combustion engine. The output of such permanent magnet generators generally have a full wave bridge rectifier circuit associated with the output circuit thereof to produce a series of immediately adjacent half cycle pulses of the same polarity. The voltage regulator 10 may be considered a three terminal device having a common ground terminal 16 which may be connected to the chassis or frame of a vehicle.

A current control device 18, here illustrated as preferably being a silicon controlled rectifier, has its anode electrode 18a connected to terminal 12 and its cathode electrode 18b connected to terminal 14. The silicon controlled rectifier 18 acts as a fast acting electronic switch which selectively connects terminal 12 to terminal 14 to apply power to the output of the voltage regulator in response to selected trigger pulses, to be described. These trigger pulses are applied to a controlled electrode 18c of the silicon controlled rectifier 18 in response to conduction of a unijunction transistor 20. The unijunction transistor 20 has base electrodes $B_1$ and $B_2$ connected to respective series resistors 22 and 24 which have resistance values to develop trigger pulses of the desired amplitude. Connected in series with resistor 22, unijunction transistor 20 and resistor 24 is a resistor 26 and a capacitor 28. Resistor 26 and capacitor 28 form a signal translating network which passes half cycles of alternating current voltage as received at the input terminal 12 to a resistance-capacitance charging network connected to the emitter electrode of the unijunction transistor 20. This resistance capacitance network comprises a resistor 30 and a potentiometer 32 connected in series with a charging capacitor 34. As charge is accumulated on capacitor 34 the voltage across capacitor 34 correspondingly increases to a value which ultimately renders the unijunction transistor 20 conductive to cause current flow between the base electrodes $B_1$ and $B_2$ and to cause discharge of capacitor 34 through the emitter E and base $B_2$ junction of the unijunction transistor 20. This action will develop an output signal across the resistor 24. A resistor 36 is connected in series with capacitor 34 to limit the discharge rate of the capacitor into the emitter and base electrodes of the unijunction transistor 20. However, resistor 36 may be eliminated if desires, or may be switchably disconnected from the circuit, which action will automatically connect capacitor 34 to ground potential.

The trigger pulses developed at the output of unijunction transistor 20 are coupled to the control electrode 18c by means of a coupling capacitor 38 and a signal developing resistor 39. As the amplitude of a given half cycle of alternating voltage applied to input terminal 12 increases at a sinusoidal rate so also does the voltage developed across the unijunction transistor 20. This progressively increasing voltage requires that a higher voltage be developed across capacitor 34 to render the unijunction transistor 20 conductive, because of the increased voltage gradient across the base electrode of the transistor 20, to produce the desired trigger pulse. However, the circuit arrangement herein disclosed provides means for causing automatic phase shift of the trigger pulses so that the half cycle pulse of applied voltage at the anode 18a will cause conduction of the silicon controlled rectifier 18 at a point in time between 0° and 180° of each half cycle of the sinusoidal voltage. Also, in this embodiment trigger pulses may be completely eliminated when the current requirement of this load is reduced.

In this embodiment the means to create the phase shift include the resistor 26 and capacitor 28 together with, among other things, the proper selection of resistance and capacitance values of the capacitor 34 and resistor 30 and potentiometer 32 connected in series therewith. When a trigger pulse is to be applied to the gate electrode 18c at a point in time beyond the 90° phase shift angle of the applied sinusoidal half cycle pulse, the charge on capacitor 34 increases at a rate determined by the RC time-constant in the circuit. Because of the corresponding increase in voltage across the unijunction transistor 20, when in the nonconductive state, it automatically requires that a higher voltage be developed across capacitor 34 to render the unijunction transistor 20 conductive. However, upon decreasing of the applied voltage, during the decreasing portion of a half cycle pulse between 90° and 180° phase angles thereof, capacitor 34 remains substantially at its previous charged value while the voltage across base electrodes $B_1$ and $B_2$ of the unijunction transistor 20 decrease to cause the unijunction transistor 20 to become highly conductive thereby discharging the capacitor 34 in a usual and conventional manner well-known in the art to develop the trigger pulse.

To control the rate of charge of capacitor 34 in response to the average output voltage at the output terminal 14 the transistor 40 has its emitter and collector electrodes shunting the capacitor 34 to vary the charge rate thereof in response to the conduction value of transistor 40, which conduction value may change from time to time as a result of forward bias applied to the base electrode of transistor 40 via a resistor 42 which is connected to the output terminal 14. Also, transistor 40 will partially discharge capacitor 34 during decrease of the voltage of a given half cycle pulse, i.e. between 90° and 180° phase angle to provide the necessary phase shift in this range. To set the maximum current conduction condition of the transistor 40 a fixed resistance 44 and a variable resistance 46 are connected in parallel with one another and between the base electrode of transistor 40 and ground potential. With fixed amplitude voltage of the half cycle pulses applied to the input terminal 12, variation in the average value of the output voltage at terminal 14 will correspondingly change the conduction condition of transistor 40 because of the feedback path provided by resistor 42 which, in turn, will change the rate of charge of capacitor 34 to advance or retard the phase angle points at which the trigger pulse will render silicon controlled rectifier 18 conductive.

On the other hand, where the load connected to the output terminal 14 remains relatively constant but the amplitude of the applied alternating current voltage at terminal 12 varies, the phase shift point of the trigger pulse is substantially controlled by the changes in voltage across the unijunction transistor 20 and the rate of charge of capacitor 34, that is, decreasing voltage amplitude at terminal 12 will cause a corresponding decrease in phase shift of a trigger pulse coupled through capacitor 38, thus resulting in applying more power to output terminal 14, and an increase in voltage at input terminal 12 will cause a corresponding increase in phase shift of the trigger pulse applied through capacitor 38 to cause a corresponding decrease in the average power applied to terminal 14.

Most advantageously, a reference voltage device 50 has one end thereof connected to the juncture between resistors 22 and 26 and the other end thereof connected to ground potential to limit the maximum voltage drop across the unijunction transistor 20. Preferably the reference voltage device 50 is a Zener diode which has its anode electrode connected to ground potential and its cathode electrode connected at the juncture between resistor 22 and 26, this being the case only where positive half cycles of alternating current voltage are applied to the input terminal 12. That is, the conductive polarity of the active components illustrated in FIG. 1 are arranged for operation with positive polarity half cycles pulses, it being understood that reversing the conducting polarity of the active components will enable negative polarity half cycles pulses to be translated and regulated by the voltage regulator 10. Preferably the reference potential of the Zener diode 50 is greater than the reference potential provided through resistor 42. For example, the voltage range of the reference potential of Zener diode 50 may be between 12 and 24 volts while the reference potential through resistor 42 may be between 6 and 14 volts, these values being selected depending on the particular use of the regulator circuit. A filter capacitor 52 is connected across the output terminal 14 and ground potential to provide a relatively constant feedback voltage to the base electrode of transistor 40 during operation of the voltage regulator 10. The Zener diode 50 has a breakover voltage which is selected to limit the maximum voltage drop across the base electrodes $B_1$ and $B_2$ of unijunction transistor 20 within prescribed limits so as to cause a trigger pulse to always be developed through capacitor 38 regardless of the amplitude of the applied voltage at input terminal 12 so long as the output average power is equal to or below the required value. That is, increasing amplitude will cause a corresponding increase in phase shift of the trigger pulse developed by the unijunction transistor 20 until a maximum phase shift is attained as a result of limiting the voltage drop across the unijunction transistor 20 by means of the Zener diode 50.

Figure 2:
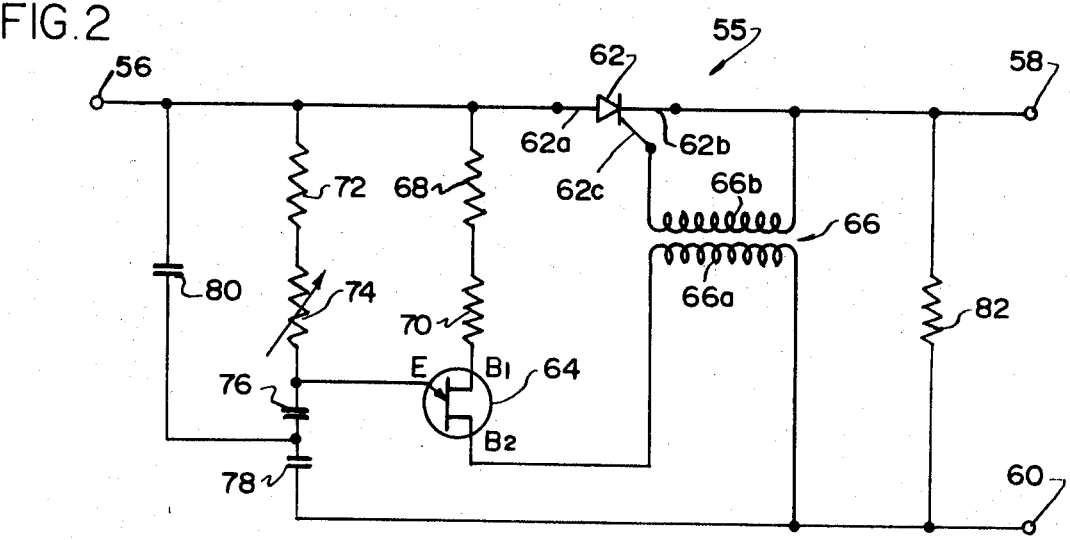
FIG. 2 is a schematic wiring diagram of an alternate embodiment of this invention.

Referring now to FIG. 2 there is seen an alternate embodiment of a voltage regulator constructed in accordance with this invention and designated generally by reference numeral 55. Here also, an input terminal 56 is arranged for receiving half cycle pulses of sinusoidal waveshape preferably from a source of alternating current voltage which varies in amplitude and frequency and which may be developed by a permanent magnet alternator driven by an internal combustion engine. An output terminal 58 is arranged for connection to a current utilization means which forms a load, such utilization means being, for example, light bulbs or other electrical devices. A common terminal 60 is arranged for connection to ground potential which may be the frame or chassis of a motor vehicle or snowmobile, or the like. Here a silicon controlled rectifier 62 has its anode electrode 62a connected to the input terminal 56 and its cathode electrode 62b connected to the output terminal 58. The gate electrode 62c receives trigger pulses in response to conduction of a unijunction transistor 64, which trigger pulses are developed in a primary winding 66a of a pulse forming transformer 66. A secondary winding 66b of the transformer 66 is connected between the gate and cathode electrodes 62c and 62b, respectively, of the silicon controlled rectifier 62 to trigger the same into conduction when the gate electrode 62c is positive with respect to the cathode electrode 62b. Proper operating potential is applied across the base electrodes $B_1$ and $B_2$ of the unijunction transistors 64 by means of a pair of series connected resistors 68 and 70 and the base electrode $B_2$ is connected in series with the primary winding 66a.

To render the unijunction transistor 64 conductive its emitter electrode is connected to input terminal 56 via a fixed resistor 72 and a potentiometer 74. Here, the proper phase shift of the trigger pulse is obtained by a capacitor 76 connected in series with a second capacitor 78 both of which receive charging current as a result of current flow through resistor 72 and potentiometer 74. Also, the phase shift characteristic of a trigger pulse developed by unijunction transistor 64 is influenced by means of capacitor 80 having one end thereof connected to the input terminal 56 and the other end thereof connected to the juncture between the capacitors 76 and 78.

In this instance, only a resistor 82, preferably of high resistance value, as for example in the order of about 10,000 ohms more or less, is connected across the output terminal 58 and ground potential. In this circuit arrangement there will always be at least a minimum portion of each half cycle of the applied voltage coupled to the output terminal 58 even under no load conditions.

Figure 3:
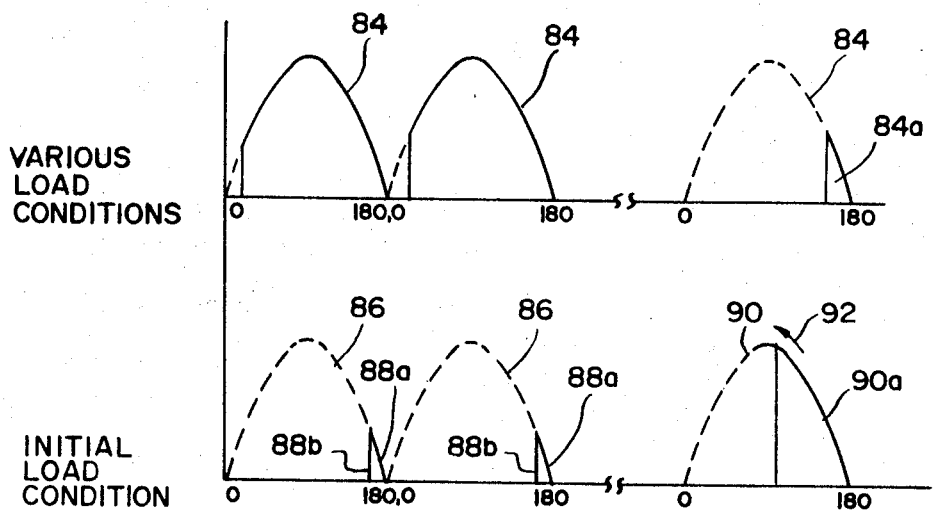
FIG. 3 illustrates a series of waveform wherein the broken line portion together with the solid line portion of the waveforms illustrates the voltage applied to the input voltage of the regulator while only the solid line portion of the waveforms illustrates the output of the voltage regulator.

For a better understanding of the operation of the circuit illustrated in FIG. 2 reference is now made to the voltage curves illustrated in FIG. 3. A series of half cycle pulses of alternating current voltage are immediately successive pulses as obtained from a full-wave voltage rectifier circuit or bridge rectifier circuit, not shown, connected between an alternator and the input terminal 56. The solid lined portion of each half cycle waveform 84 illustrates the conductive condition of the current controlled rectifier 62 while the dotted lined portion of each cycle waveform 84 illustrates the nonconductive condition of silicon controlled rectifier 62. With a maximum load connected to the output terminal 58 the phase angle time point at which a trigger pulse is applied to the gate electrode 62c is very near 0° so as to cause substantially the entire pulse of each half cycle to be applied to the output terminal 56 by rendering the silicon controlled rectifier 62 conductive early in each half cycle. However, by decreasing the load at output terminal 56, or by increasing the input voltage at terminal 56, the trigger pulse will be increased in phase shift so as to occur at a point in time anywhere between substantially 0° and some phase angle greater than 90° but less than 180°. That is, power at the output terminal 58 is reduced by causing only a small portion of each half cycle pulse, here illustrated by the solid lined portion 84a, to be conducted through the silicon controlled rectifier 62.

The waveforms 86 illustrate the current conduction condition of current controlled rectifier 62 when no load is connected to the output terminal 58. Here it can be seen that at least a small fractional portion of each half cycle of the applied alternating current voltage is translated through the silicon controlled rectifier 62, as indicated by the solid lined portion 88a. For example, a no load condition at the output terminal 58 will cause an automatic phase shift to occur so that trigger pulses are applied to the gate electrode 62c at approximately 120° phase shift, more or less, as indicated by the vertical line 88b of the solid lined portions 88a, this phase shift being caused by the capacitor 76, 78 and 80. By providing a continuous but small amount of current at the output terminal 58, which may be dissipated across the resistor 82 under no load conditions, an input voltage value at input terminal 56 which would otherwise increase the phase angle of the trigger pulse to 180° to render the voltage regulator circuit 55 inoperative, is now limited to a phase shift of approximately 120°, more or less, so that operation of the voltage regulator 55 is continuous for all voltage values applied at the input terminal 56. The waveform 90 illustrates the automatic increase in applied power to the output terminal 58 upon an increase in the load condition. That is, the phase angle is decreased as indicated by the arrow line 92, so as to cause a greater portion of each half cycle, here illustrated by the solid lined portion 90a, to be applied to the output terminal 58.

In this embodiment it should be noted that the open circuit or substantially open circuit, voltage at the output terminal 58 is reduced below the voltage value of the applied half cycle pulses at the input of terminal 56 since the silicon controlled rectifier 62 is conductive substantially down the slope of each half cycle. This may be considered as a safety feature since it is usually the case where no load conditions cause a substantial increase in the open circuit voltage. Also, by always having a portion of each half cycle of the applied voltage existent at the output terminal 58 it minimizes the effects of the surge current through various current utilization devices, such as lamps or the like, to decrease the possibility of burning out the lamp filaments.

Accordingly, the voltage regulator circuits of the illustrated embodiments provide means for regulating voltage from an alternating current power source, such as a permanent magnet alternator which develops variable frequency and variable voltage at the output thereof, and wherein the regulated voltage is applied to an output terminal which can be connected to a load circuit free of an external battery source.

We claim:

1. A voltage regulator circuit comprising, in combination, input terminal means for connection to a source of variable amplitude alternating current voltage, output terminal means for delivering load current to a load, said load current being variable in accordance with load demands, a current control device having load electrodes connected between said input and output terminal means and further having a control electrode, a control circuit coupled to said control electrode to apply triggering pulses thereto at points in time corresponding to the phase angle at which said current control device is to be rendered conductive, a first sensing circuit connected to said control circuit for causing a phase angle shift of said triggering pulses in response to variations of input amplitude of the alternating current voltage, and a second sensing circuit connected to said control circuit for causing a phase angle shift of said triggering pulses in response to variations of load current through said output terminal means.

2. The voltage regulator circuit of claim 1 wherein said control circuit includes a unijunction transistor having first and second base electrodes connected to receive current from said input terminal, said second base electrode coupled to said control electrode of said current control device, a variable reference voltage means responsive to the variable amplitude alternating current voltage and to the load current passing through said output terminal means and coupled to the emitter electrode of said unijunction transistor to control conduction thereof and produce triggering pulses between 0° phase angle of the applied variable amplitude alternating current voltage and a predetermined degree of phase angle beyond 90°, and a second reference voltage means connected across the base electrodes of said unijunction transistor to limit the value of said predetermined degree of phase angle beyond 90° by limiting the voltage applied across said first and second base electrodes.

3. The voltage regulator circuit of claim 2 wherein said variable reference means has a voltage value less than said second reference voltage means.

4. The voltage regulator circuit of claim 3 wherein said variable reference voltage means has a voltage value which varies within a range of 6 to 14 volts, and said second reference voltage means has a voltage value in a range of 12 to 24 volts.

5. The voltage regulator circuit of claim 2 wherein said second base electrode of said unijunction transistor is coupled to said control electrode of said current control device through a capacitor.

6. The voltage regulator circuit of claim 1 wherein said control circuit includes a unijunction transistor having first and second base electrodes arranged to receive current from said input terminal means, said second base electrode coupled to said control electrode of said current control device through a capacitor.

7. The current control device of claim 1 wherein said first sensing circuit includes resistance means connected in series with first and second capacitors and arranged for connection to receive current from said input terminal means, a third capacitor having one end thereof connected to said input terminal and the other end thereof connected between said first and second capacitors, and means coupling the change on said first and second capacitors to said control circuit to produce a triggering pulse therefrom in response to the desired phase angle.

8. The voltage regulator circuit of claim 2 wherein said predetermined degree of phase angle beyond 90° is 120°.